(12) United States Patent
Agam et al.

(10) Patent No.: US 6,344,642 B1
(45) Date of Patent: Feb. 5, 2002

(54) DOOR CONTROL APPARATUS

(75) Inventors: Uri Agam, Petach Tikva; Eli Gal, Ramat Gan, both of (IL)

(73) Assignee: Sensotech Ltd., Petach Tikva (IL)

( * ) Notice: Subject to any disclaimer, the term of this patent is extended or adjusted under 35 U.S.C. 154(b) by 0 days.

(21) Appl. No.: 09/068,314

(22) PCT Filed: Nov. 4, 1996

(86) PCT No.: PCT/IL96/00142

§ 371 Date: Jun. 12, 1998

§ 102(e) Date: Jun. 12, 1998

(87) PCT Pub. No.: WO97/17520

PCT Pub. Date: May 15, 1997

(30) Foreign Application Priority Data

Nov. 5, 1995 (IL) .................................................. 115876

(51) Int. Cl.[7] .............................................. E05F 15/20
(52) U.S. Cl. ..................................... 250/221; 250/341.1
(58) Field of Search ............................. 250/221, 222.1, 250/341.1, 341.8, 342; 340/454, 552, 555

(56) References Cited

U.S. PATENT DOCUMENTS

| | | |
|---|---|---|
| 2,826,753 A | 3/1958 | Chapin |
| 4,029,176 A | 6/1977 | Mills |
| RE30,719 E | 8/1981 | Mills |
| 4,590,410 A | 5/1986 | Jonsson |
| 4,706,227 A | 11/1987 | DuVall et al. |
| 4,713,892 A | 12/1987 | Strauss |
| 4,779,240 A | 10/1988 | Dorr |
| 4,864,296 A | 9/1989 | Trett et al. |
| 4,967,083 A | 10/1990 | Kornbrekke .................. 250/341 |
| 4,976,337 A | 12/1990 | Trett |
| 5,001,557 A | 3/1991 | Begle |
| RE33,668 E | 8/1991 | Gray |
| 5,142,152 A | 8/1992 | Boiucaner .................... 250/341 |
| 5,147,410 A | 9/1992 | Heindl et al. |
| 5,148,410 A | 9/1992 | Kuhn |
| 5,149,921 A | 9/1992 | Picado |
| 5,276,391 A | 1/1994 | Jonsson |
| 5,319,611 A | 6/1994 | Korba |
| 5,337,289 A | 8/1994 | Fasching et al. |
| 5,339,075 A | 8/1994 | Abst et al. |
| 5,341,334 A | 8/1994 | O'Brien et al. |
| 5,373,482 A | 12/1994 | Gauthier |
| 5,399,075 A | 3/1995 | Frank et al. |
| 5,412,297 A | 5/1995 | Clark et al. |
| 5,420,430 A | 5/1995 | Trett |
| 5,450,057 A | 9/1995 | Watanabe |
| 5,467,072 A | 11/1995 | Michael |
| 5,518,086 A | 5/1996 | Tyni |
| 5,903,355 A | * 5/1999 | Schwarz ..................... 250/221 |

FOREIGN PATENT DOCUMENTS

| | | |
|---|---|---|
| FR | 2 200 969 | 4/1974 |
| FR | 2 583 453 | 12/1986 |
| JP | 57141614 | 8/1982 |

* cited by examiner

*Primary Examiner*—John R. Lee
(74) *Attorney, Agent, or Firm*—Darby & Darby

(57) ABSTRACT

Door control apparatus for vehicles including at least one sensor viewing at least one region in the vicinity of a door, logic circuitry responsive to the sensor for providing at least one region clear output signal and automatic door opening and door closing apparatus responsive at least to the absence of a region clear signal to cause opening of the door and responsive at least to the presence of a region clear output signal to cause closing of the door.

29 Claims, 19 Drawing Sheets

DOOR CONTROL APPARATUS

FIELD OF THE INVENTION

The present invention relates to safety apparatus which finds application, for example, in automatic door apparatus and machine tools.

BACKGROUND OF THE INVENTION

Automatic doors are in widespread use in various applications, such as elevators, buses and trains. Considerations of personal safety require that doors not be closed when there is a danger that a person might be impacted thereby. While not compromising safety considerations, considerations of efficiency dictate that doors be closed as promptly and quickly as possible.

There exist various techniques and apparatus for sensing the absence of a person and his accouterments within a predefined zone and consequently operating an automatic door. U.S. Pat. Nos. 4,029,176; 4,590,410; 4,779,240; 4,976, 337; 5,001,557; 5,149,921; 5,276,391; 5,412,297; 5,420, 430; RE 33,668 and RE 30,719 exemplify the state of the art. U.S. Pat. No. 5,412,297 employs a tactile obstruction detector, while U.S. Pat. Nos. 4,590,410 and 5,276,391 employ optical detectors. U.S. Pat. No. 2,826,753, which relates to object detection in a confined environment and not to door opening or closing, and U.S. Patents RE 30,719; 4,029,176 and 5,147,410 employ acoustic energy and are believed by applicant to be the closest prior art to the present invention. Other distance and direction measuring apparatus is described in U.S. Pat. Nos. 5,467,072; 5,450,057; 5,373, 482; 5,341,344; 5,339,075; 5,337,289 and 5,319,611.

SUMMARY OF THE INVENTION

The present invention seeks to provide a secure and efficient door operating system which maximizes door closing efficiency while minimizing the risk of injury to users.

There is thus provided in accordance with a preferred embodiment of the present invention a door control apparatus for vehicles including at least one sensor viewing at least one region in the vicinity of a door, logic circuitry responsive to the at least one sensor for providing at least one region clear output signal, automatic door opening and door closing apparatus responsive at least to the absence of a region clear output signal to cause opening of the door and responsive at least to the presence of a region clear output signal to cause closing of the door.

Furthermore in accordance with a preferred embodiment of the present invention wherein the automatic door opening and door closing apparatus is responsive at least to the absence of a region clear output signal to cause opening of the door and responsive at least to the presence of the same region clear output signal to cause closing of the door.

Additionally in accordance with a preferred embodiment of the present invention wherein the automatic door opening and door closing apparatus is responsive at least to the absence of a first region clear output signal in respect of a first region to cause opening of the door and responsive at least to the presence of a second region clear output signal, different from the first region clear output signal, in respect of a second region different from the first region, to cause closing of the door.

Furthermore in accordance with a preferred embodiment of the present invention, the first and second regions are mutually overlapping, mutually exclusive and partially mutually overlapping.

There is also provided in accordance with a preferred embodiment of the present invention a safety apparatus for preventing injurious engagement of machinery with a user and clothing and accouterments thereof within a predetermined volume including a sensor having two modes of operation, a reference sensing mode of operation for sensing the boundaries of the predetermined volume, and an engagement prevention mode of operation for sensing the presence of a user and clothing and accouterments thereof within the predetermined volume and control apparatus responsive to outputs from the sensor in both of the modes of operation for preventing operation of the machinery when the presence of a user and clothing and accouterments thereof within the predetermined volume could cause injurious engagement.

Additionally in accordance with a preferred embodiment of the present invention, the sensor comprises at least one ultrasonic transducer.

Furthermore in accordance with a preferred embodiment of the present invention, the sensor is operative in the reference sensing mode of operation in the absence of a user or operator within the predetermined volume.

Additionally in accordance with a preferred embodiment of the present invention wherein the sensor is operative in the reference sensing mode of operation with generally the same frequency as it is operative in said engagement prevention mode of operation.

Moreover in accordance with a preferred embodiment of the present invention, the sensor is operative in the reference sensing mode of operation with a frequency much less than it is operative in the engagement prevention mode of operation.

Additionally in accordance with a preferred embodiment of the present invention, the sensor comprises at least two sensors viewing the predetermined volume and together providing an output indication of the location of objects within the predetermined volume in at least two dimensions and wherein the control apparatus is responsive to the output indication for preventing operation of said machinery when the presence of a user and clothing and accouterments thereof at predetermined locations within the predetermined volume could cause injurious engagement.

Still further in accordance with a preferred embodiment of the present invention wherein the control apparatus is operative to be non-responsive to predetermined regions within an outer boundary of the predetermined volume, corresponding to predetermined time domains.

There is also provided in accordance with a preferred embodiment of the present invention a safety apparatus for preventing injurious engagement of machinery with a user and clothing and accouterments thereof within a predetermined volume including at least two sensors viewing the predetermined volume and together providing an output indication of the location of objects within the predetermined volume in at least two dimensions, control apparatus responsive to the output indication for preventing operation of the machinery when the presence of a user and clothing and accouterments thereof at predetermined locations within the predetermined volume could cause injurious engagement.

Additionally in accordance with a preferred embodiment of the present invention, the at least two sensors comprise at least two ultrasonic transducers.

Furthermore in accordance with a preferred embodiment of the present invention, the control apparatus excludes predetermined three-dimensional regions from the predetermined volume corresponding to predetermined combinations of different time domains of the at least two sensors.

There is also provided in accordance with a preferred embodiment of the present invention a door operating system comprising an automatically operable door, a sensor for sensing the presence of an object within a predetermined volume located at the door of the vehicle and above steps leading to the door of the vehicle from the outside thereof, and a door controller operative at least partially in response to an output from the sensor to actuate the automatically operable door.

In accordance with a preferred embodiment of the present invention the sensor is an ultrasonic sensor. Alternatively any other suitable type of sensor may be employed provided that it is insensitive to inputs received from outside the predetermined volume.

In accordance with a preferred embodiment of the present invention, the automatic door operating system is mounted on a vehicle, such as a bus or train and the predetermined volume is located at the steps leading to the door from the outside thereof.

Further in accordance with a preferred embodiment of the present invention, there is provided a vehicle having a chassis, a body and propulsion apparatus, the body including at least one door operating system comprising an automatically operable door, a sensor for sensing the presence of an object within a predetermined volume located at the door of the vehicle and above steps leading to the door of the vehicle from the outside thereof, and a door controller operative at least partially in response to an output from the sensor to actuate the automatically operable door.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
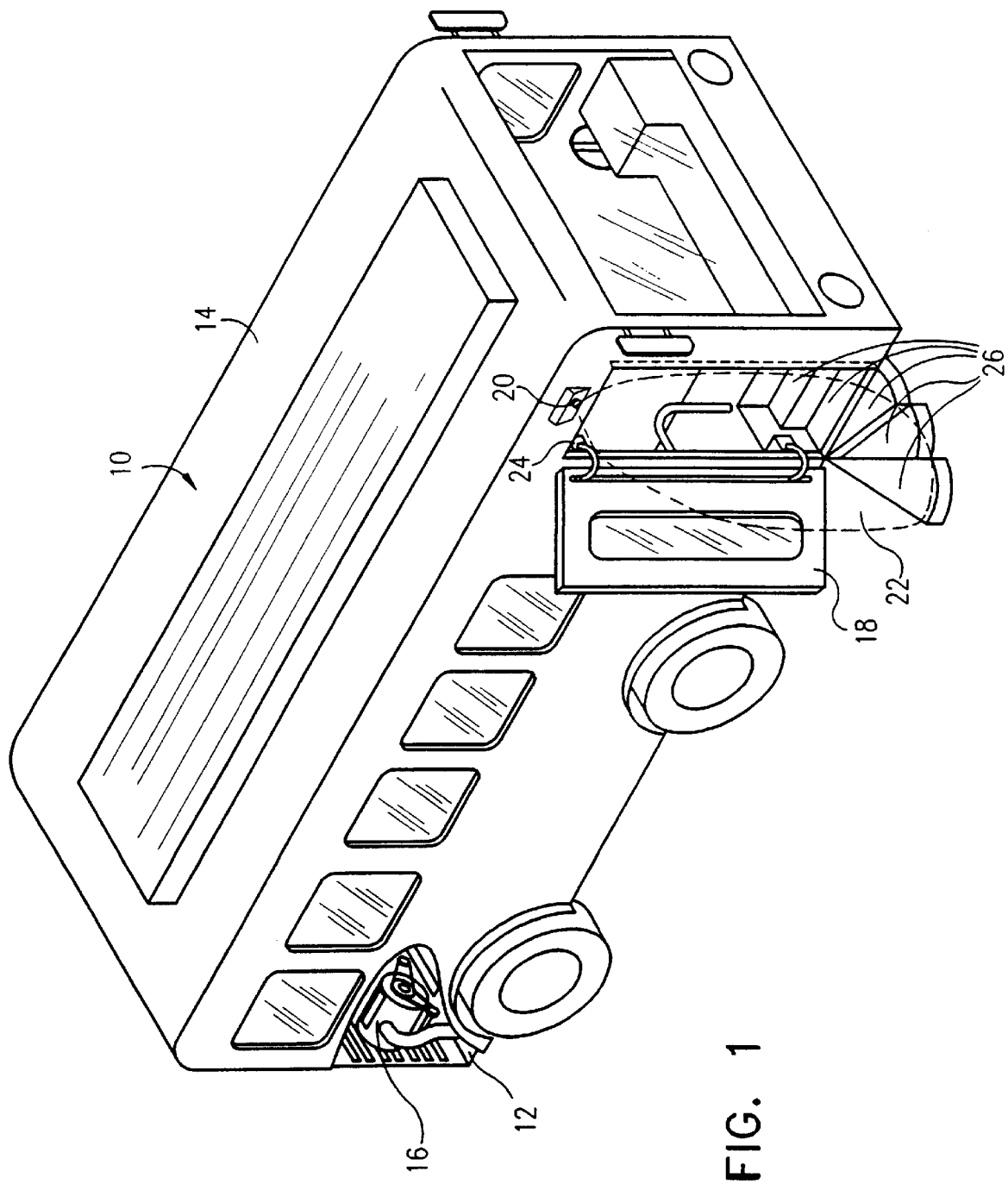
FIG. 1 is a simplified pictorial illustration of a bus having an automatic door operating system constructed and operative in accordance with a preferred embodiment of the present invention.

Reference is now made to FIG. 1, which illustrates a vehicle, such as a bus 10, having a chassis 12, a body 14 and propulsion apparatus 16. The body 14 includes at least one door operating system. In accordance with a preferred embodiment of the invention, the door operation system is an automatic system, comprising an automatically operable door 18, a sensor 20 for sensing the presence of an object within a predetermined volume 22, also termed the "protected" volume, in the vicinity of the door, and a door controller 24 operative at least partially in response to an output from the sensor 20 to actuate the automatically operable door.

Alternatively, the door operation system may be semi-automatic wherein the door controller 24 provides an output indication to the driver, who, responsive thereto, opens or closes the door.

In accordance with a preferred embodiment of the invention, the predetermined volume 22 covers the region of the door and above steps 26 leading to the door 18 from the outside thereof and does not extend outwardly thereof, thereby to avoid false detections of objects or images beyond the steps.

Figure 2A:
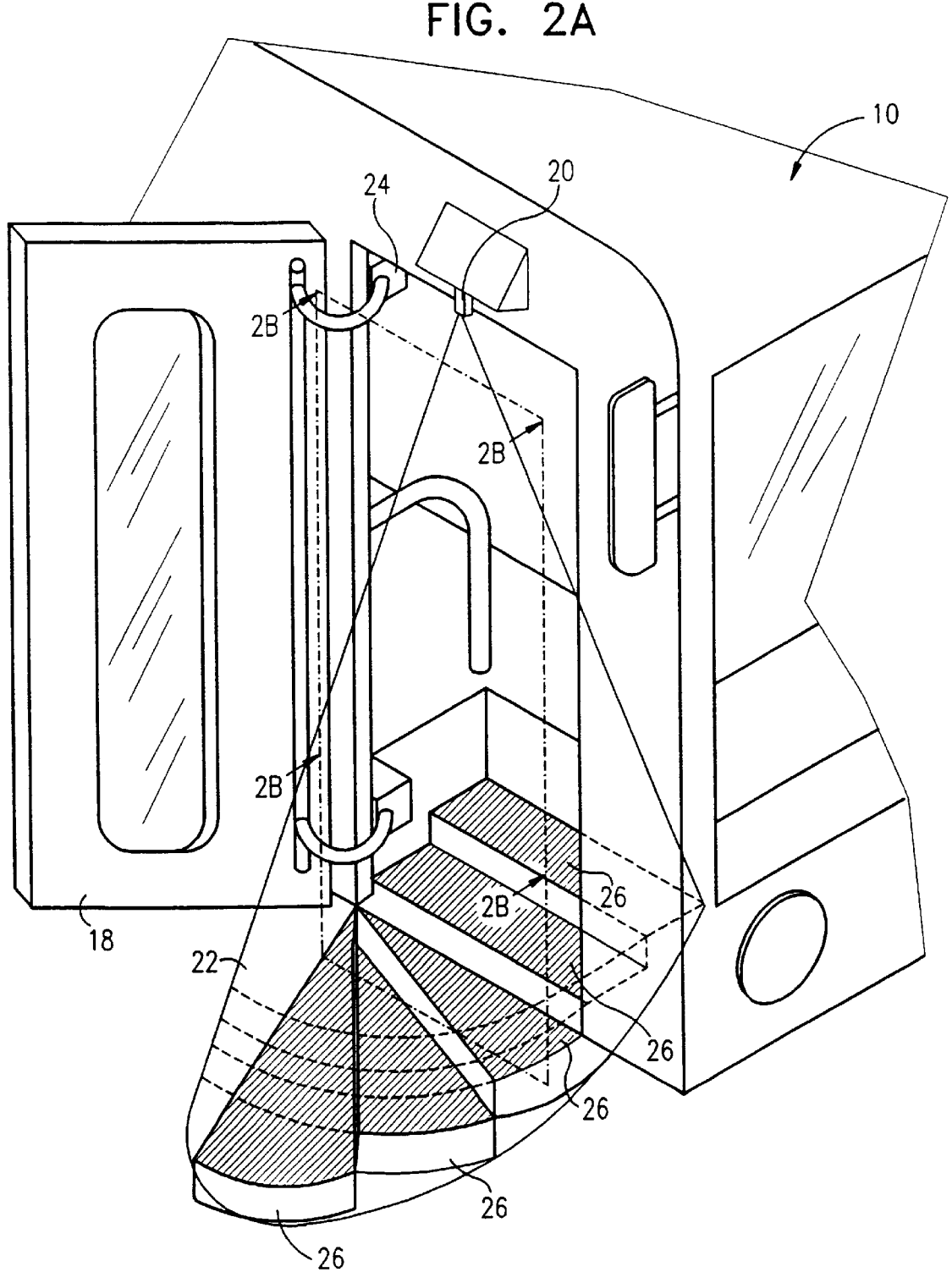
FIG. 2A is an illustration of an automatic door operating system constructed and operative in accordance with a preferred embodiment of the present invention and employing a single sensor.
Figure 2B:
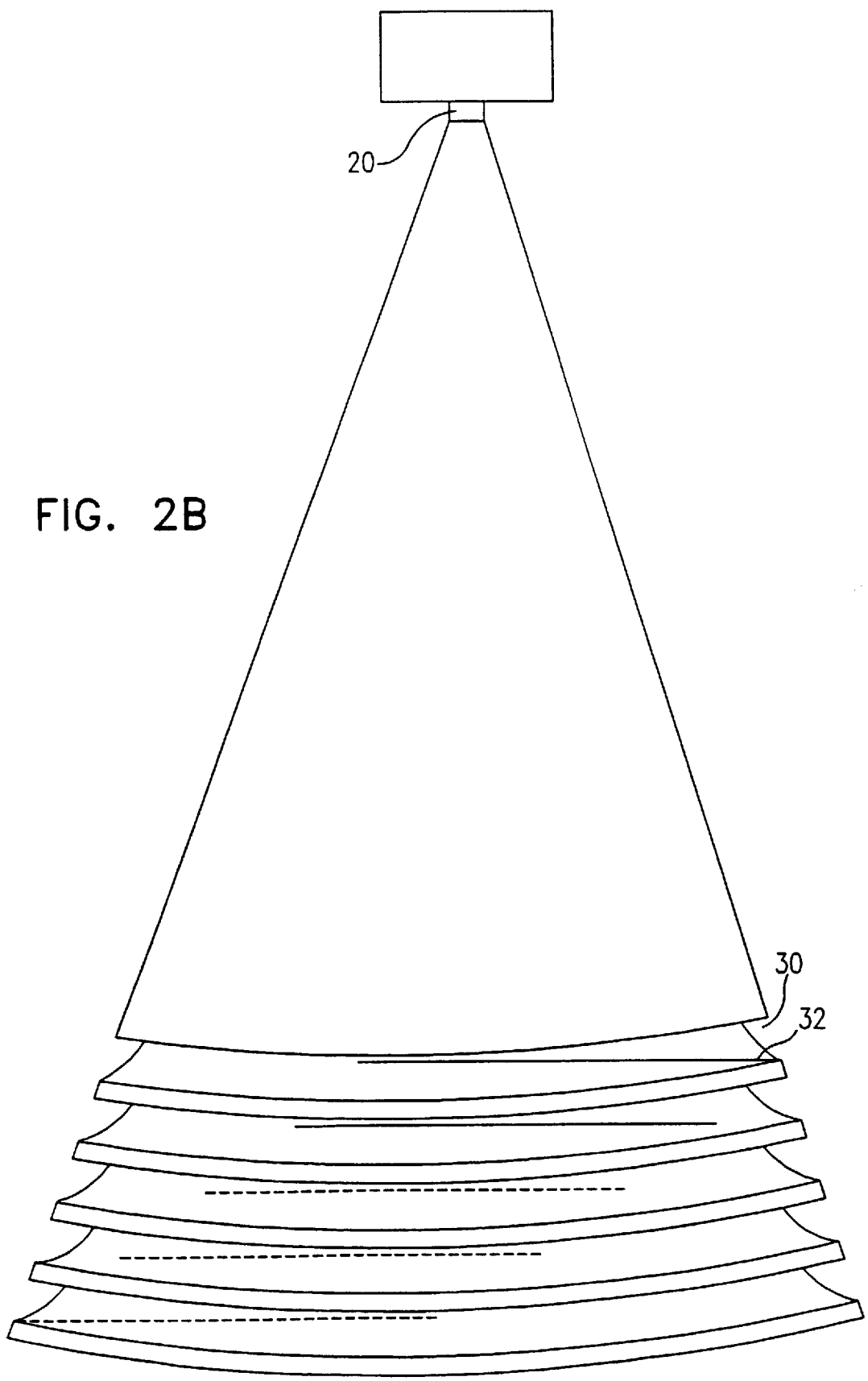
FIG. 2B is a sectional illustration taken along the plane 2B designated in FIG. 2A.

Reference is now made to FIGS. 2A and 2B, which illustrate an automatic door operating system constructed and operative in accordance with a preferred embodiment of the present invention and employing a single sensor. It may be appreciated that the single sensor, indicated by reference numeral 20, views all of the steps 26.

In accordance with a preferred embodiment of the present invention, sensor 20 is an ultrasonic transceiver or any other suitable sensor which transmits energy into a volume and senses energy reflected therefrom. It is known to limit boundaries of the field of view of such sensors by limiting the time duration over which received reflected energy is taken into account, in other words, by limiting the time window of reflected energy from a volume thereby to define a desired protected volume.

In accordance with a preferred embodiment of the invention, not only the boundaries of the field of view of sensor 20 are limited, but also the internal configuration of the protected volume is defined by suitably limiting the time window of reflected energy.

Referring now particularly to FIG. 2B, it can be seen that if it is desired to eliminate energy reflections from the top facing surfaces of steps 26, it is necessary to ignore energy reflections during certain intervals of time within the time window. These intervals correspond to predetermined radial distance outlines from the sensor 20 and are indicated in FIG. 2B by reference numerals 30.

The resulting outlines of the distances corresponding to the intervals are thus seen to be curved. Within each distance outline, a corresponding top surface 32 of a step 26 is schematically drawn to illustrate that due to the curvature of the distance outlines, the thickness thereof must be sufficient to enable the outline to enclose the entire top surface 32 of the step.

Figure 3A:
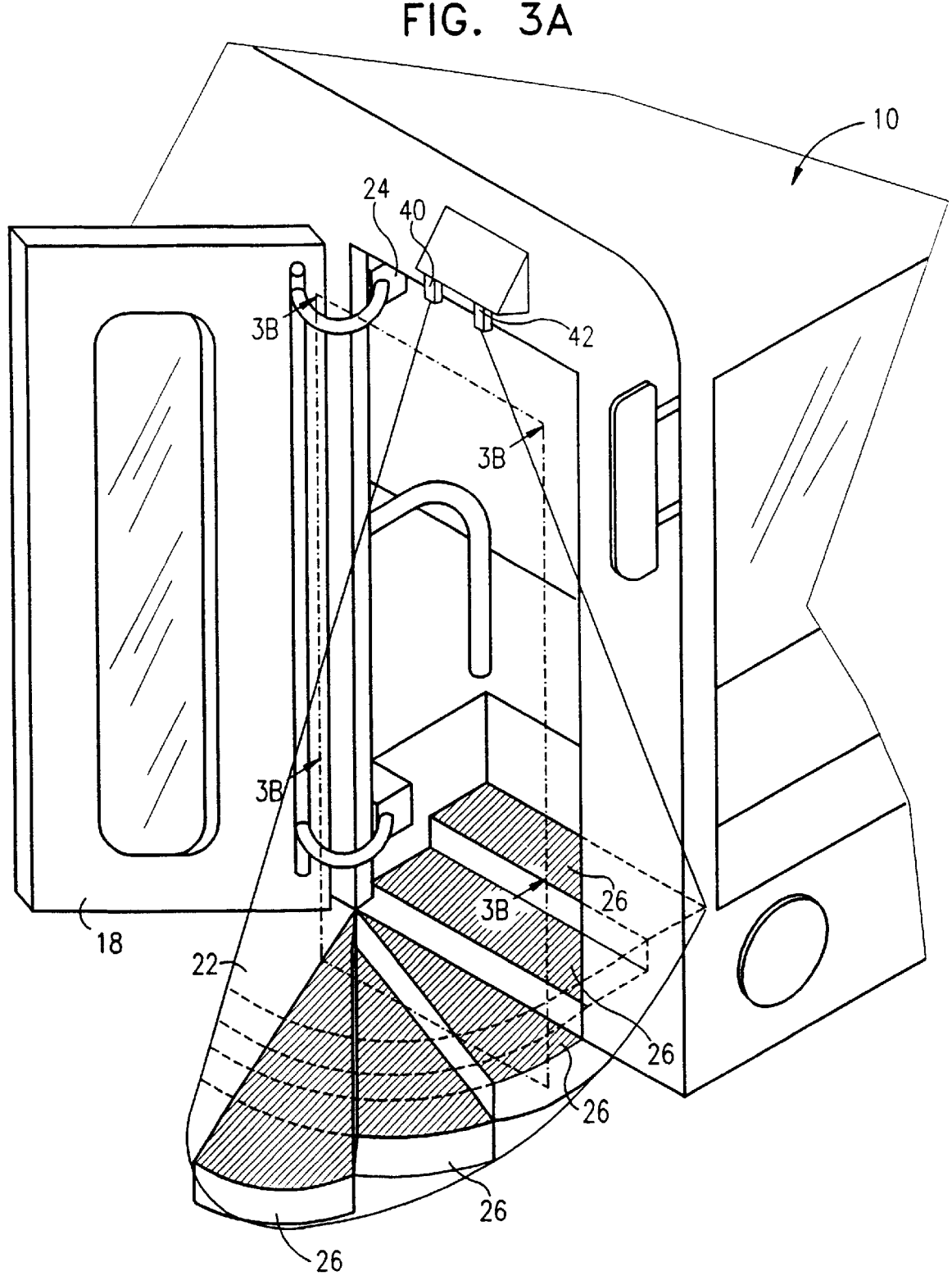
FIG. 3A is an illustration of an automatic door operating system constructed and operative in accordance with a preferred embodiment of the present invention and employing two sensors.
Figure 3B:
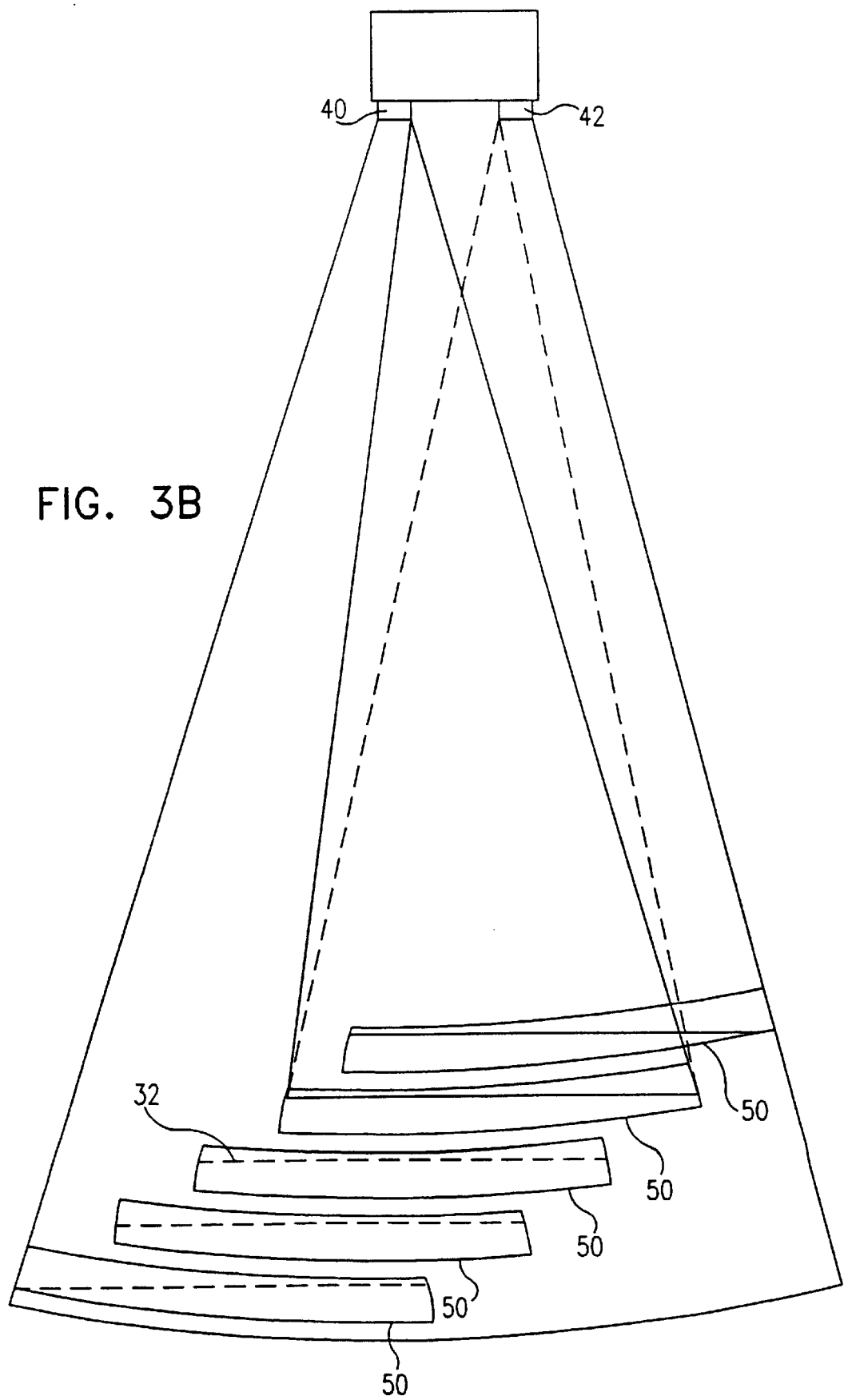
FIG. 3B is a sectional illustration taken along the plane 3B designated in FIG. 3A.

Reference is now made to FIGS. 3A and 3B, which illustrate an automatic door operating system constructed and operative in accordance with another preferred embodiment of the present invention and employing a pair of sensors 40 and 42. It may be appreciated that the pair of sensors view all of the steps 26.

In accordance with a preferred embodiment of the present invention, sensors 40 and 42 are ultrasonic transceivers or any other suitable sensors which transmits energy into a volume and senses energy reflected therefrom.

In accordance with a preferred embodiment of the invention, the internal configuration of the protected volume is defined not only by suitably limiting the time window of reflected energy but also by triangulation in two dimensions by virtue of the time differences in receipt of reflections by the individual sensors.

Referring now particularly to FIG. 3B, it can be seen that if it is desired to eliminate energy reflections from the top facing surfaces of steps 26, it is not necessary to ignore energy reflections during full intervals of time within the time window, as in the embodiment of FIGS. 2A and 2B. Only portions of these intervals, corresponding to the width and location of the facing surfaces of the steps 26 need be ignored. These portions are determined by triangulation of the outputs of the two sensors 40 and 42 and are indicated in FIG. 3B by reference numerals 50.

Within each distance outline corresponding to an interval outline, a corresponding top surface 32 of a step 26 is schematically drawn to illustrate that the location and width of the portion of the distance outline which is ignored corresponds to the width and location of the step and is determined by triangulation.

Figure 4A:
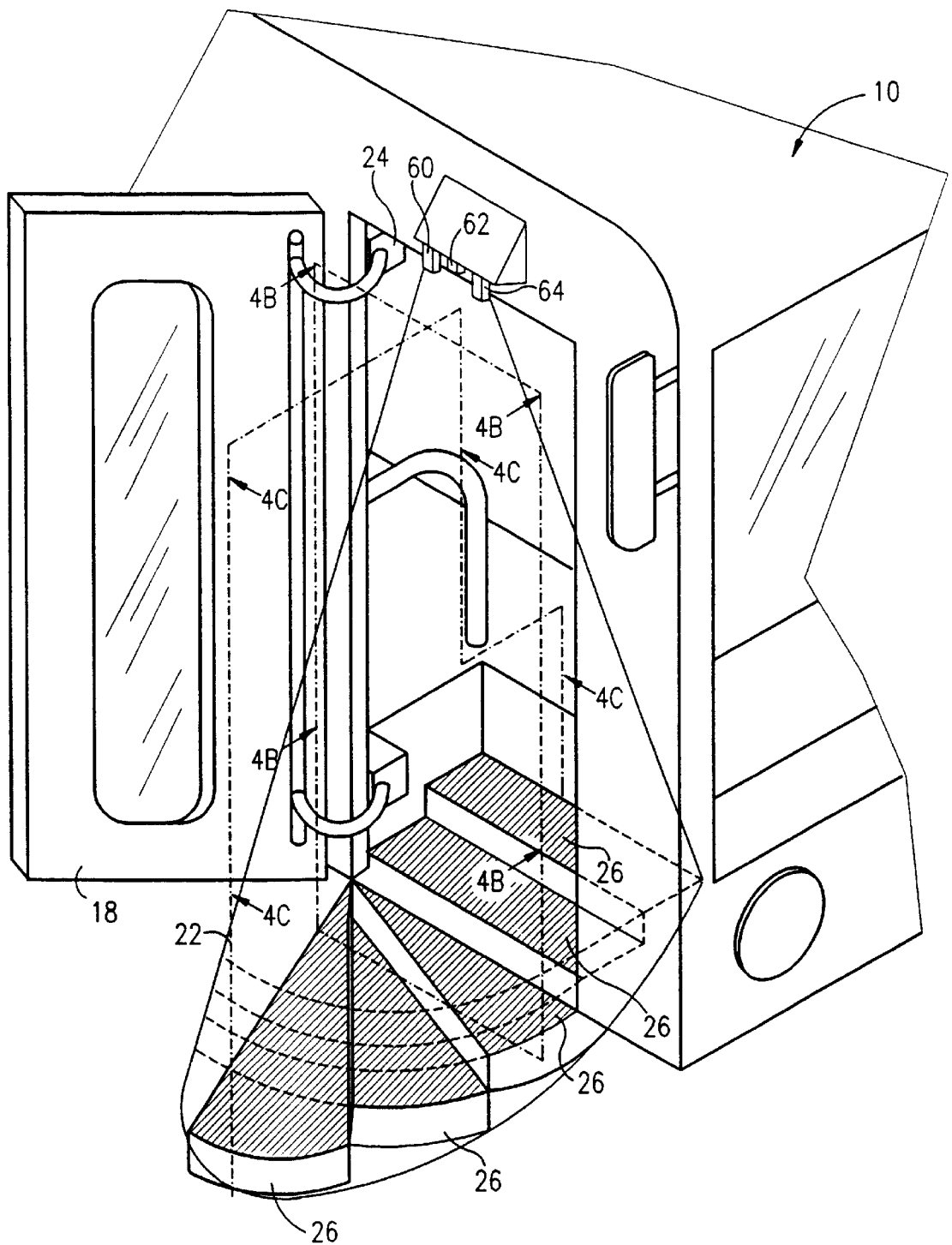
FIG. 4A is an illustration of an automatic door operating system constructed and operative in accordance with a preferred embodiment of the present invention and employing three sensors.
Figure 4B:
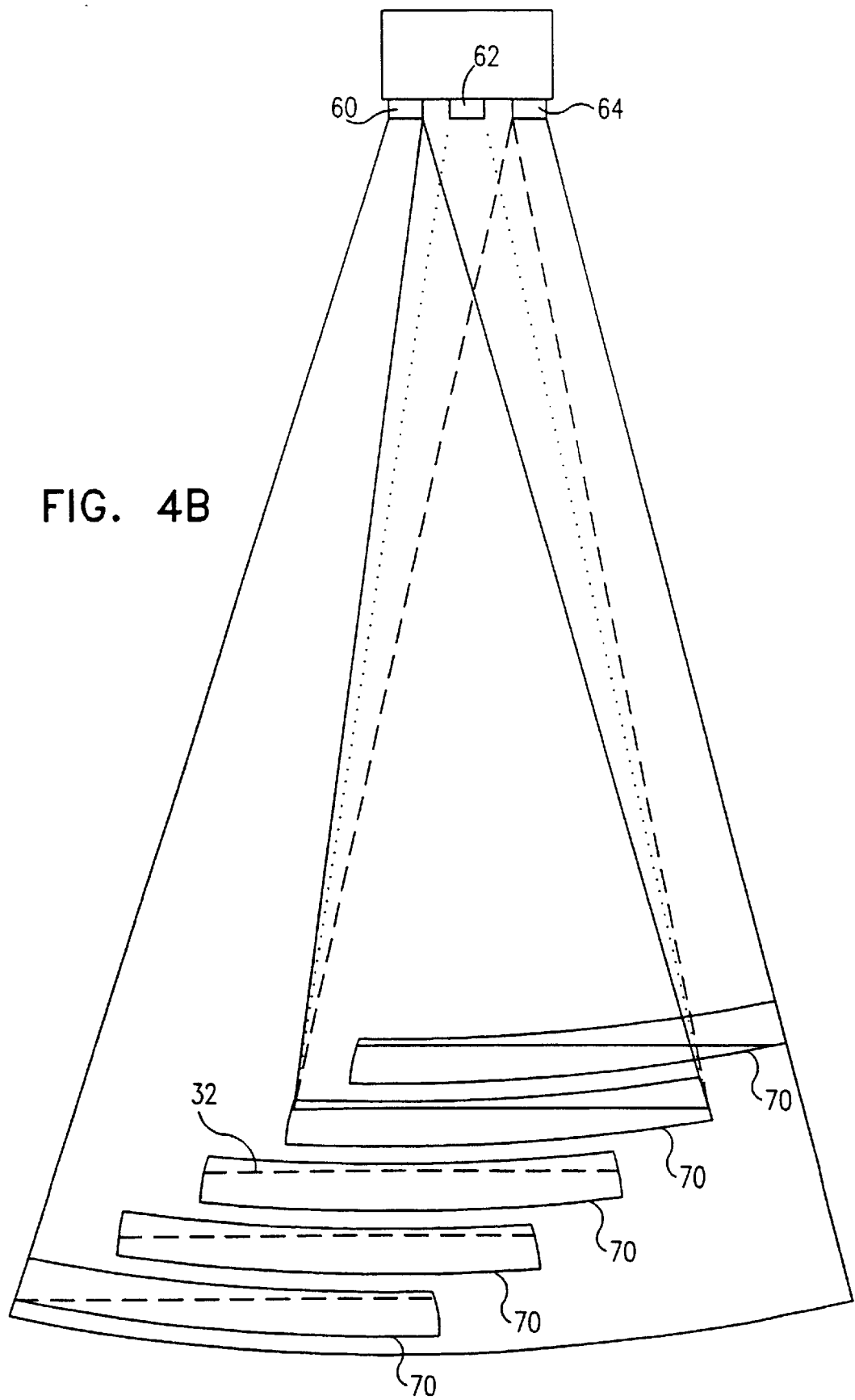
FIG. 4B is a sectional illustration taken along the plane 4B designated in FIG. 4A.
Figure 4C:
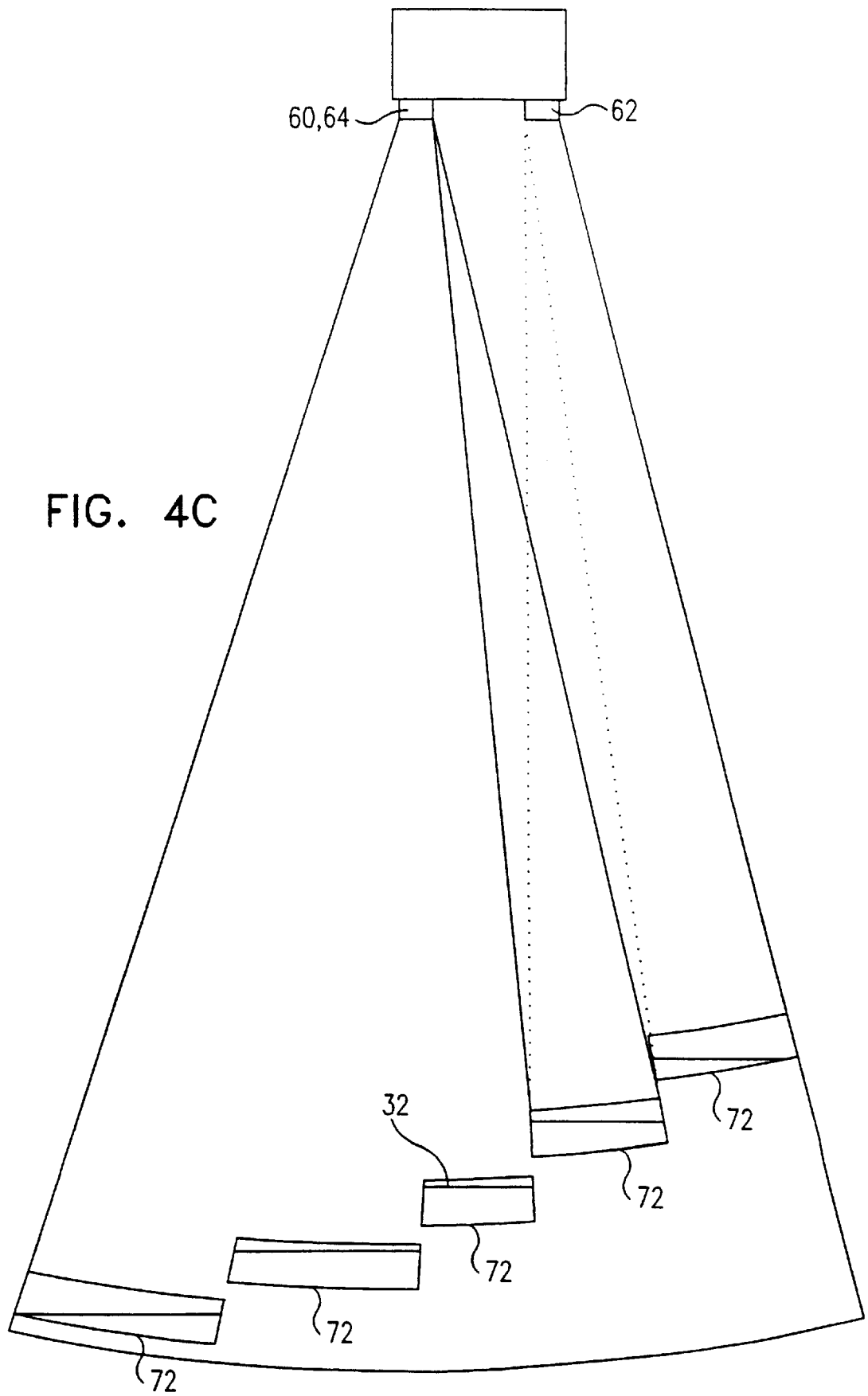
FIG. 4C is a sectional illustration taken along the plane 4C designated in FIG. 4A.

Reference is now made to FIGS. 4A, 4B and 4C, which illustrate an automatic door operating system constructed and operative in accordance with another preferred embodiment of the present invention and employing three sensors 60, 62 and 64. It may be appreciated that the three sensors view all of the steps 26.

In accordance with a preferred embodiment of the present invention, sensors 60, 62 and 64 are ultrasonic transceivers or any other suitable sensors which transmits energy into a volume and sense energy reflected therefrom.

In accordance with a preferred embodiment of the invention, the internal configuration of the protected volume is defined not only by suitably limiting the time window of reflected energy but also by triangulation in three dimensions.

Referring now particularly to FIGS. 4B and 4C, it can be seen that if it is desired to eliminate energy reflections from the top facing surfaces of steps 26, it is not necessary to ignore energy reflections during full intervals of time within the time window, as in the embodiment of FIGS. 2A and 2B. Only portions of these intervals, corresponding to the width, depth and location of the top facing surfaces of the steps 26 need be ignored. These portions are determined by triangulation of the outputs of the three sensors 60, 62 and 64 and are indicated in FIG. 4B by reference numerals 70 and in FIG. 4C by reference numerals 72.

Within each distance outline corresponding to an interval outline, a corresponding top surface 32 of a step 26 is schematically drawn to illustrate that the location, depth and width of the portion of the distance outline which is ignored corresponds to the depth, width and location of the step and is determined by triangulation in three dimensions.

Figure 5A:
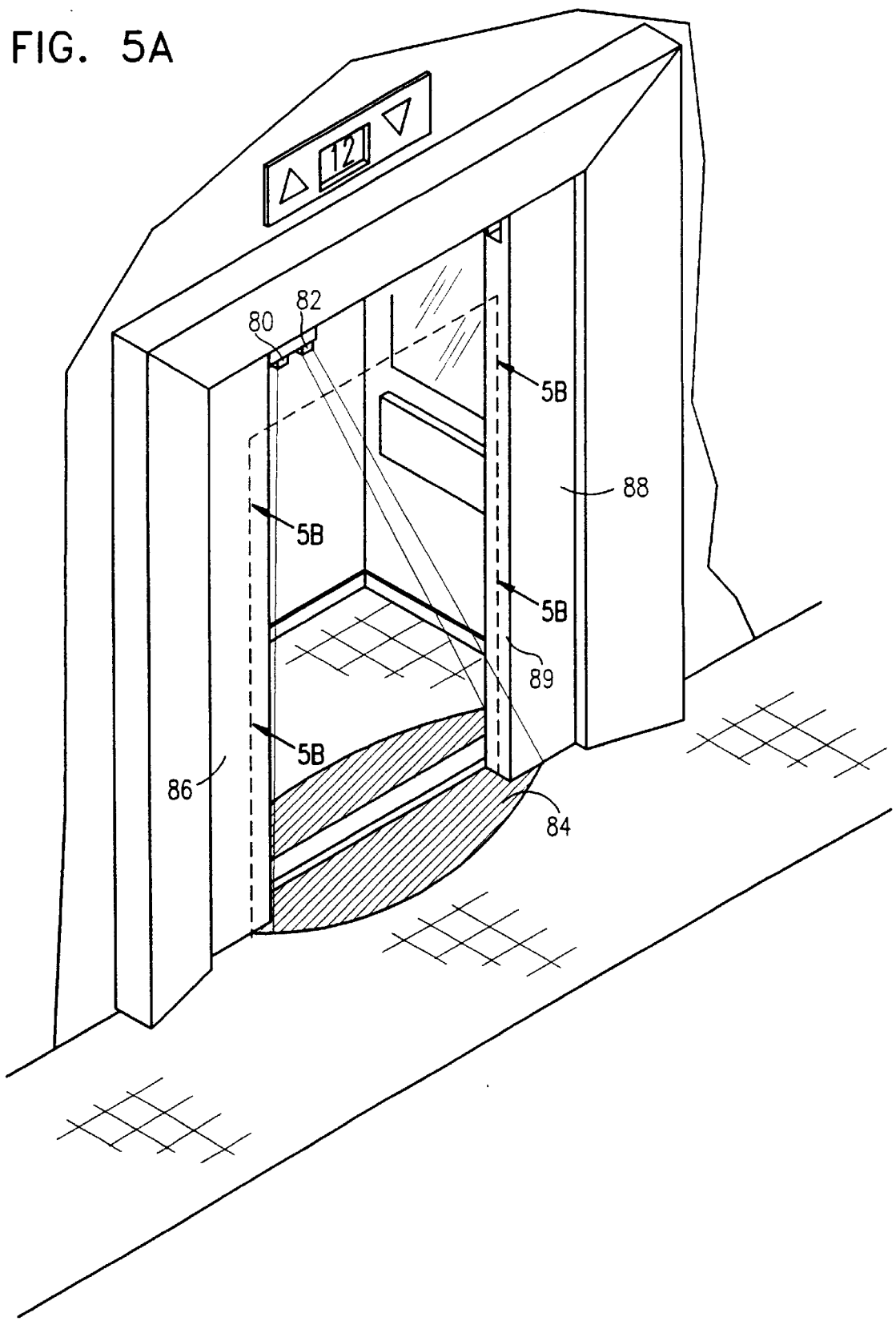
FIG. 5A is an illustration of an automatic elevator door operating system constructed and operative in accordance with a preferred embodiment of the present invention and employing plural sensors.
Figure 5B:
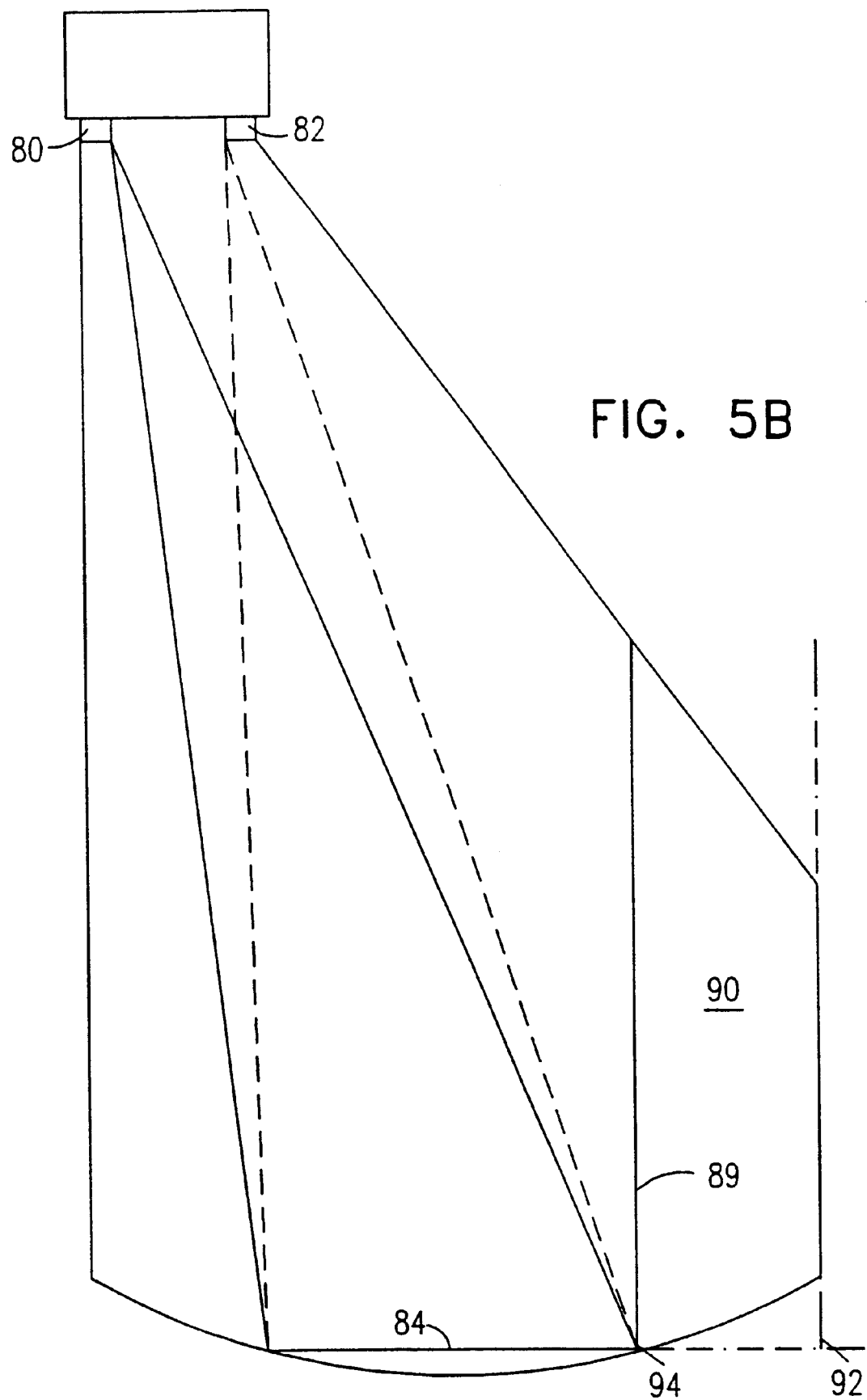
FIG. 5B is a sectional illustration taken along plane 5B—5B of FIG. 5A.

Reference is now made to FIGS. 5A and 5B, which illustrate an automatic elevator door operating system constructed and operative in accordance with another preferred embodiment of the present invention and employing a pair of sensor 80 and 82.

It may be appreciated that the pair of sensors view all of the threshold 84 on both sides of elevator doors 86 and 88 as well as surface 89 of door 88 whose energy are to be eliminated.

In accordance with a preferred embodiment of the present invention, sensors 80 and 82 are ultrasonic transceivers or any other suitable sensors which transmit energy into a volume and senses energy reflected therefrom.

In accordance with a preferred embodiment of the invention, the internal configuration of the protected volume is defined not only by suitably limiting the time window of reflected energy but also by triangulation in two dimensions. This enables the surface 89 of the door 88 which is in the field of view of the sensors 80 and 82 to be ignored.

Referring now particularly to FIG. 5B, it can be seen that if it is desired to eliminate energy reflections from the surface 89 of door 88, it is not necessary to ignore energy reflections during a full interval of time within the time window, as in the embodiment of FIGS. 2A and 2B. Only the portions of an interval, corresponding to the location of surface 89 of door 88 need be ignored. This portion is discriminated from the return signal by triangulation of the outputs of the two sensors 80 and 82 and is indicated in FIG. 5B by reference numeral 90. Reference numeral 90 labels a region between a first position 92 of the door 89 and a second position 94 of the door 89.

Within the distance outline corresponding to a time interval outline, side surface 89 of door 88 is schematically drawn to illustrate that the location and width of the portion of the distance outline which is ignored corresponds to the width and location of the surface 89 and is discriminated by triangulation.

Figure 6A:
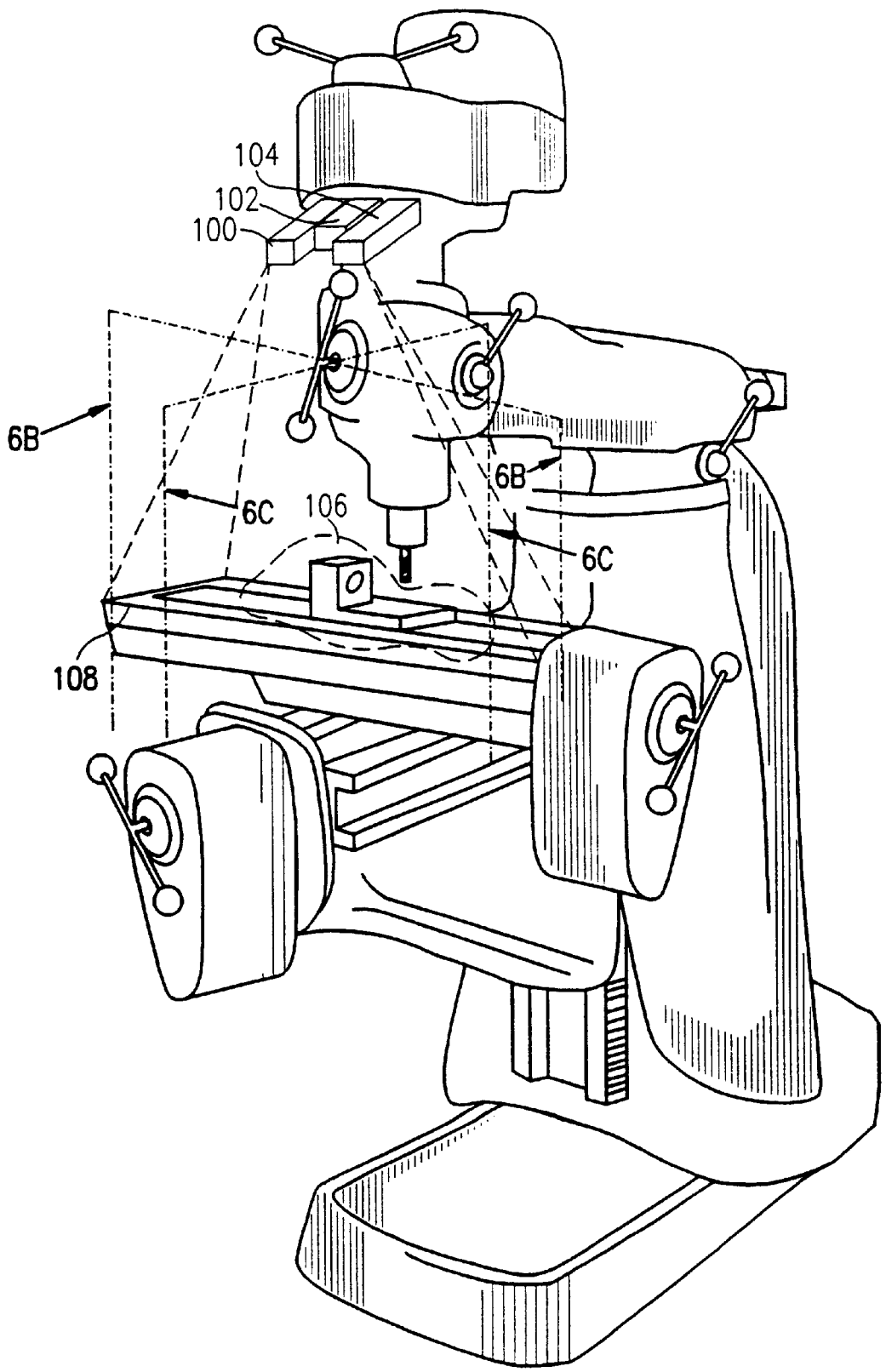
FIG. 6A is an illustration of an machine tool safety system constructed and operative in accordance with a preferred embodiment of the present invention and employing three sensors.
Figure 6B:
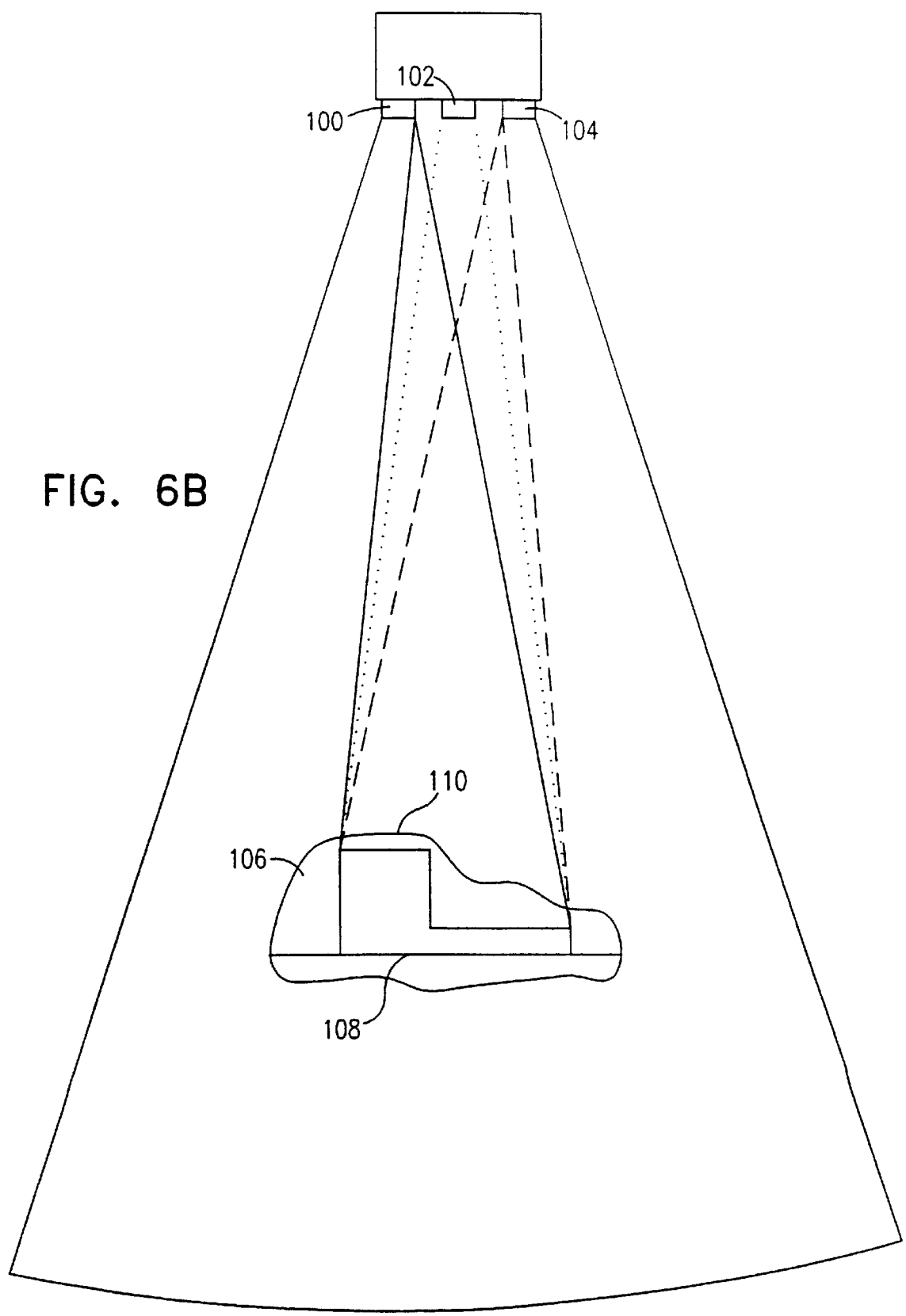
FIG. 6B is a sectional illustration taken along plane 6B—6B of FIG. 6A.
Figure 6C:
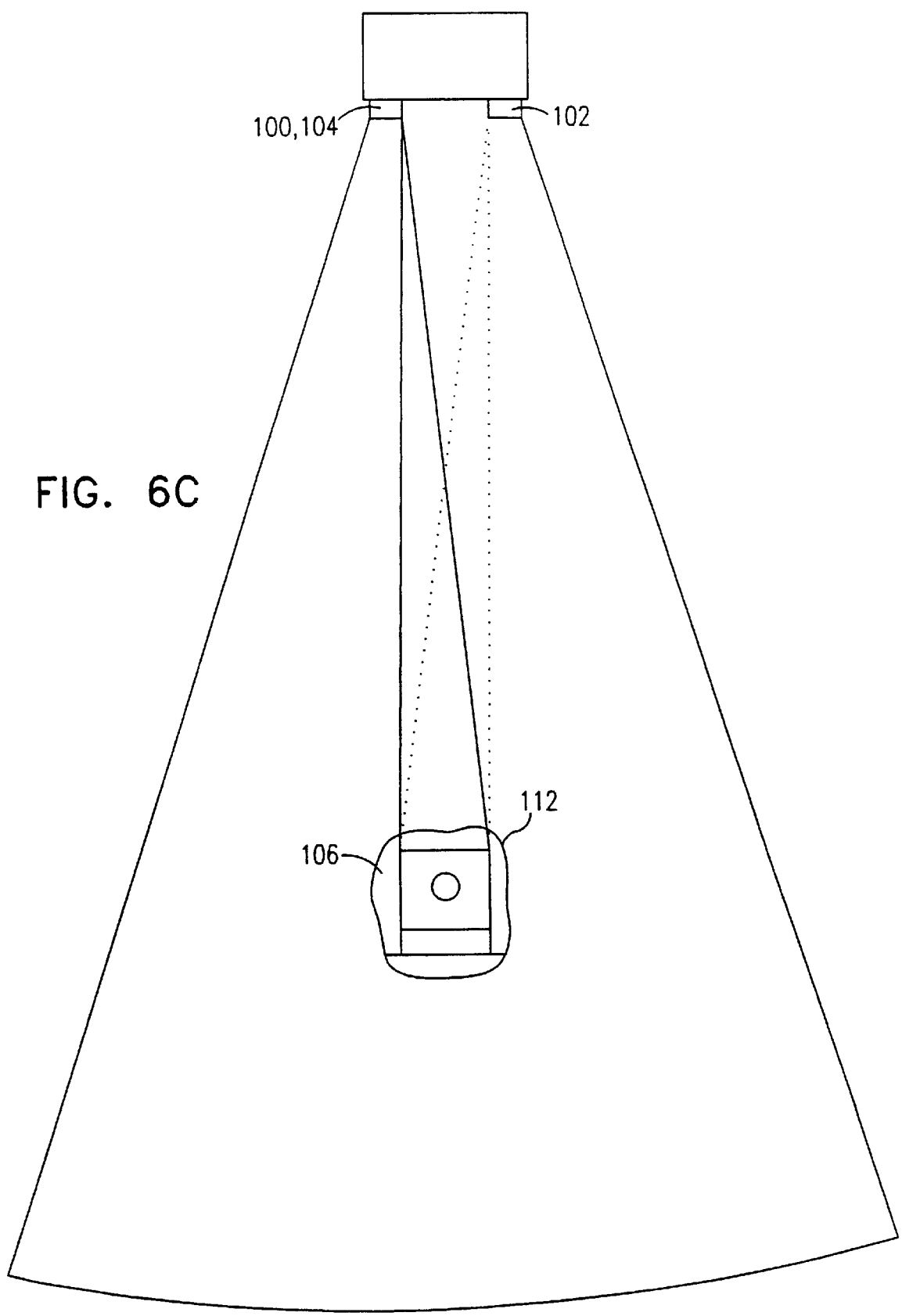
FIG. 6C is a sectional illustration taken along plane 6C—6C of FIG. 6A.

Reference is now made to FIGS. 6A, 6B and 6C, which illustrate a machine tool safety system constructed and operative in accordance with another preferred embodiment of the present invention and employing three sensors 100, 102 and 104. It may be appreciated that the three sensors view all of a workpiece region 106 which defines a protected volume.

In accordance with a preferred embodiment of the present invention, sensors 100, 102 and 104 are ultrasonic transceivers or any other suitable sensors which transmits energy into a volume and sense energy reflected therefrom.

In accordance with a preferred embodiment of the invention, the internal configuration of the protected volume is defined not only by suitably limiting the time window of reflected energy but also by triangulation in three dimensions.

Referring now particularly to FIGS. 6B and 6C, it can be seen that if it is desired to eliminate energy reflections from workpiece region 106 and from a workpiece support 108, it is not necessary to ignore energy reflections during full intervals of time within the time window, as in the embodiment of FIGS. 2A and 2B. Only portions of these intervals, corresponding to the width, depth and location of the outer facing surfaces of the region 106 and support 108 need be ignored. These portions are determined by triangulation of the outputs of the three sensors 100, 102 and 104 and are indicated in FIG. 6B by reference numerals 110 and in FIG. 6C by reference numerals 112.

Within each distance outline corresponding to an interval outline, corresponding surfaces 106 and 108 are schematically drawn to illustrate that the location, depth and width of the portion of the distance outline which is ignored corresponds to the depth, width and location of the surfaces 106 and 108 and are determined by triangulation in three dimensions.

Figure 7:
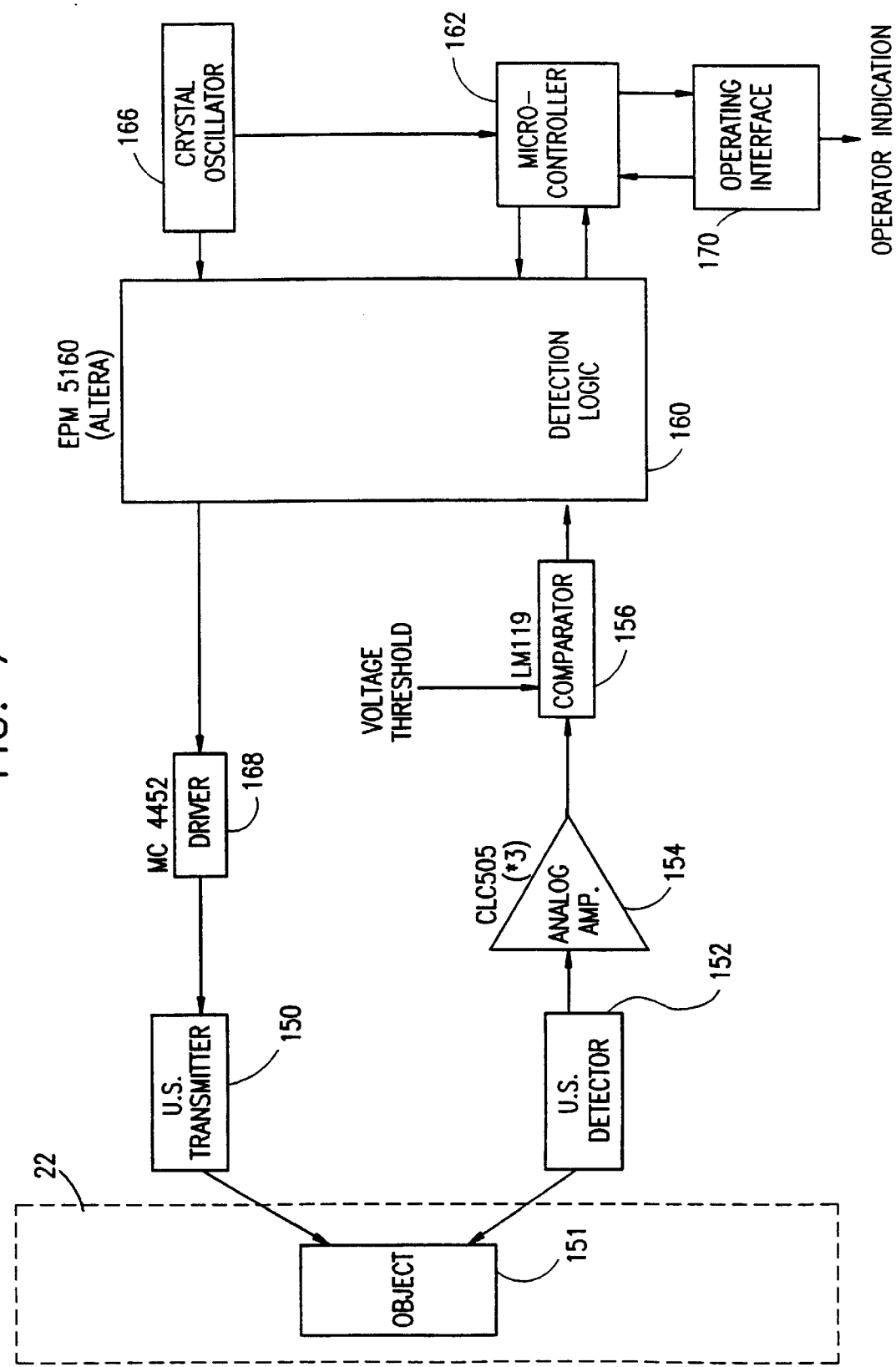
FIG. 7 is a simplified block diagram illustration of circuitry employed in the apparatus of FIG. 1 in the closing mode.

Reference is now made to FIG. 7, which is a simplified block diagram illustration of circuitry employed in the automatic door operating system of FIG. 1. An ultrasonic transmitter 150 transmits ultrasonic energy, typically having a frequency in excess of 20 KHz into the protected volume 22 (FIG. 1). Reflected ultrasonic energy from objects such as an object 151 within the protected volume 22, is received at one or more detectors 152, such as a model 400ER 250 of Prowave Company of Taiwan, which typically is sensitive only to the frequency of the transmitter 150. The transmitter 150 and the detector 152 may be embodied in an unitary transceiver.

Preferably at least one of the transmitters 150 and detectors 152 and possibly both of them are operative within predetermined solid angles, thereby to limit false detections which could result from reflections of ultrasonic energy from outside the desired predetermined volume.

In accordance with a preferred embodiment of the present invention, the arrangement of the transmitters 150 and the detectors 152 may enable the circuitry of FIG. 7 to determine the location of the object by triangulation.

The output of detector 152 is supplied to an analog amplifier 154, which may be embodied in 3 CLC505 chips. The output of the analog amplifier 154 is supplied to a threshold comparator 156, such as an LM 119 chip, which compares the output of detector 152 with a predetermined threshold.

The output of comparator 156 is supplied to detector logic circuitry 160 which defines a time window following transmission of the ultrasonic energy by transmitter 150, for receipt of reflected ultrasonic energy. This time window corresponds to distance from the transmitter and is operative to define the detection volume. The detector logic circuitry 160 is preferably embodied in an EPM 5160 chip commercially available from Altera of San Jose, Calif.

A microcontroller 162 receives an input from a crystal oscillator 166 which also provides an output to detection logic circuitry 160, which is used for actuating a driver 168, which drives transmitter 150. Driver 168 is typically embodied in a MC 4452 chip, commercially available from Motorola.

Microcontroller 162 interfaces with an operating interface circuit 170. The operating interface circuitry 170 may either provide a "CLEAR" door closing actuation signal directly to door controller 24 (FIG. 1) or alternatively provides a safety indication to an operator who operates the door controller 24.

Figure 8:
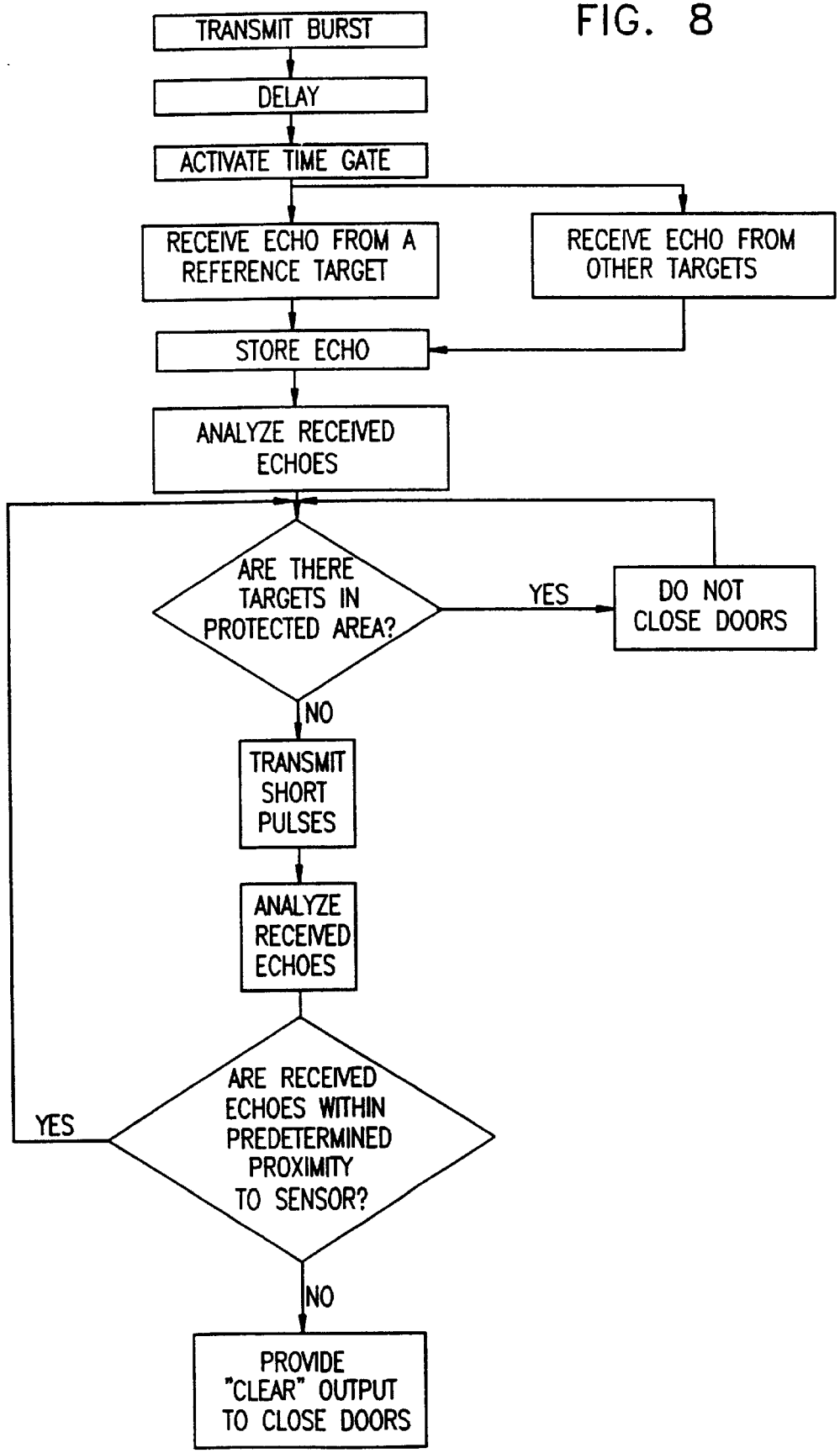
FIG. 8 is a simplified flow chart illustrating operation of the apparatus of FIG. 7.

Reference is now made to FIG. 8, which illustrates the operation of part of the circuitry of FIG. 7. The functionality which will be described hereinbelow with reference to FIG. 8 is typically carried out by detection logic circuitry 160 and/or micro-controller 162.

A burst of typically between 4 and 10 pulses of ultrasonic energy is directed to the protected volume 22 (FIG. 1). Following a predetermined time delay, a reflected energy receipt time gate is opened for receipt of echoes of ultrasonic energy reflected from the protected volume 22.

During the time that the reflected energy time gate is open echoes reflected from inside the protected volume 22 are received. These echoes preferably include echoes received from a predetermined reference target within the protected volume 22, such as the stairs of a bus, as well as echoes received from non-reference targets within the protected volume 22, such as persons or their belongings within the protected volume.

The received echoes are stored and then analyzed.

Upon analysis, if all of the echo pulses received are found to originate from a location within a predetermined proximity to the reference target, the protected volume is deemed to be clear and a "CLEAR" signal is sent to the operator.

At this stage, a short duration pulse, typically of a duration of one microsecond, is transmitted into the protected volume 22 in order to determine whether any object is within the protected volume 22 but sufficiently close to the transmitter 150 so as not to have been detected by the longer pulses. If no echoes of the short pulses are received within a predetermined time period corresponding to the protected volume, an appropriate "CLEAR" output is provided via interface 170 (FIG. 7) to either an automatic door or an operator.

If not all of the echo pulses received are found to originate from a location within a predetermined proximity to the reference target, a contrary output is provided which indicates that the doors are not to be closed.

Figure 9:
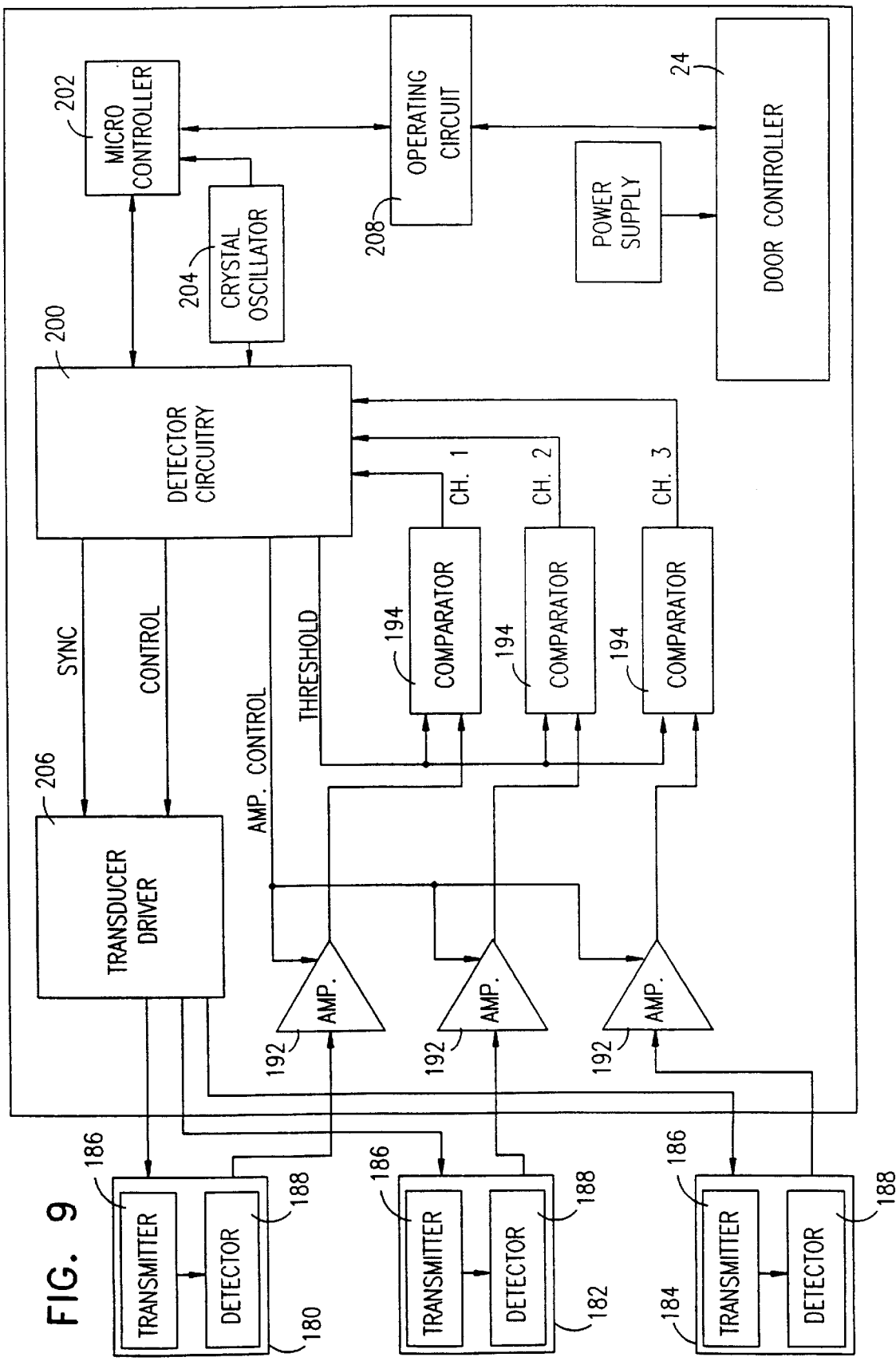
FIG. 9 is a simplified block diagram illustration of circuitry employed in the apparatus of FIGS. 4A–4C and 6A–6B.

Reference is now made to FIG. 9, which is a simplified block diagram illustration of circuitry employed in the automatic door operating system of FIGS. 4A–4C. Three separate ultrasonic transducers 180, 182 and 184, each include an ultrasonic transmitter 186 which transmits ultrasonic energy, typically having a frequency in excess of 20 KHz into the protected volume 22 (FIG. 4A). Reflected ultrasonic energy is received at three separate detectors 188, each of which forms part of one of transducers 180, 182 and 184. Detectors 188 may be any suitable detectors, such as a model 400ER 250 of Prowave Company of Taiwan, which typically is sensitive only to the frequency of the transmitter 186.

Preferably at least one of the transmitters 186 and detectors 188 and possibly both of them are operative within predetermined solid angles, thereby to limit false detections which could result from reflections of ultrasonic energy from outside the desired predetermined volume.

In accordance with a preferred embodiment of the present invention, the arrangement of the transmitters 186 and the detectors 186 may enable the circuitry of FIG. 9 to determine the location of the object by triangulation in three dimensions.

The outputs of detectors 186 are each supplied to analog amplifiers 192, which may be embodied in 3 CLC505 chips. The output of each analog amplifier 192 is supplied to a threshold comparator 194, such as an LM 119 chip, which compares the output of detector 186 with a predetermined threshold.

The outputs of comparators 194 are supplied to detector logic circuitry 200 which defines one or more time windows following transmission of the ultrasonic energy by transmitter 186, for receipt of reflected ultrasonic energy. These time windows correspond to distance from the transmitter and are operative to define the detection volume. The detector logic circuitry 200 is preferably embodied in an EPM 5160 chip commercially available from Altera of San Jose, Calif.

A microcontroller 202 receives an input from a crystal oscillator 204 which also provides an output to detection logic circuitry 200, which is used for actuating a driver 206, which drives transmitters 186. Driver 206 is typically embodied in a MC 4452 chip, commercially available from Motorola.

Microcontroller 202 interfaces with an operating interface circuit 208. The operating interface circuit 208 may either provide a "CLEAR" door closing actuation signal directly to door controller 24 (FIG. 1) or alternatively provides a safety indication to an operator who operates the door controller 24.

Figure 10:
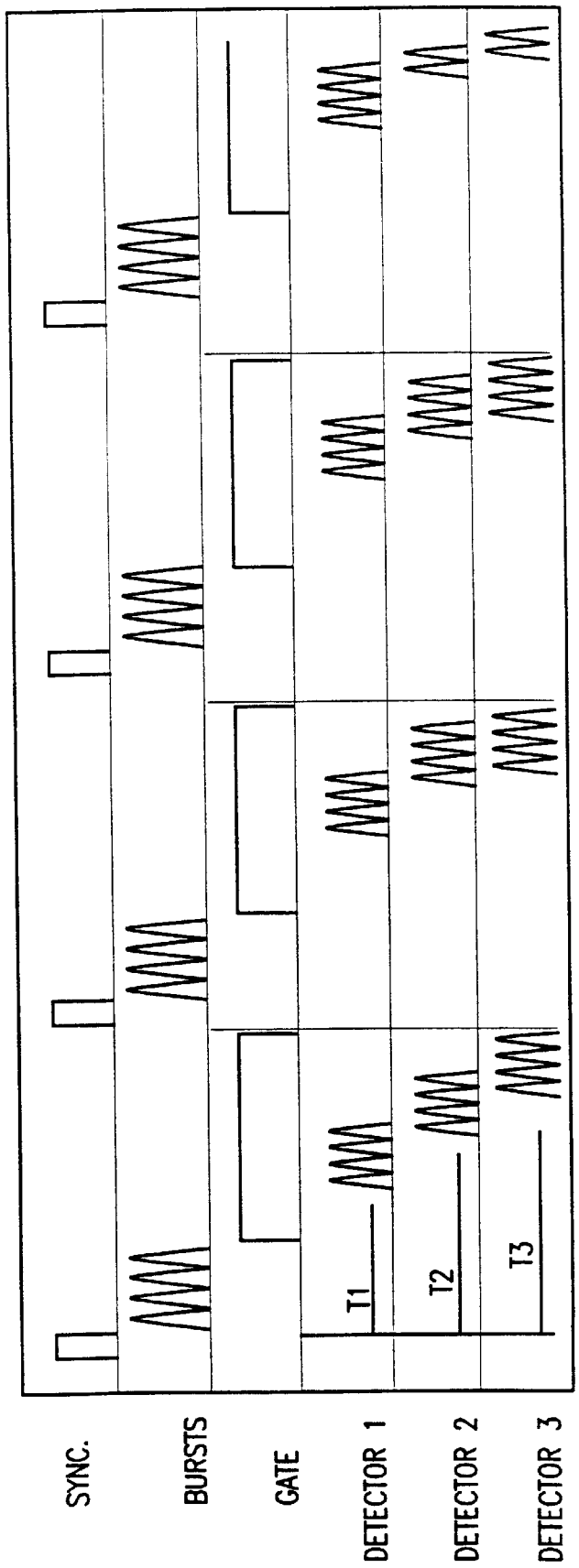
FIG. 10 is a timing diagram illustrating operation of the circuitry of FIG. 9.

Reference is now made to FIG. 10 which is a timing diagram illustrating operation of the circuitry of FIG. 9. Synchronization pulses, supplied by detector circuitry in response to an input from microcontroller 202, cause the transducer driver 206 to cause the transmitters 186 preferably in all three transducers 180, 182 and 184, to simultaneously transmit a burst of ultrasonic energy pulses into the protected volume 22 (FIG. 1). The bursts are typically of duration about 100 microseconds.

Following each burst, echoes received from the protected volume 22 are received by detectors 188 of the transducers 180, 182 and 184. The outputs of detectors 188 are only considered if they fall within a time window defined by a gate interval generated by microcontroller 202. In the illustrated example of FIG. 10, the echoes of the bursts are received at different times by different detectors. Clearly the time of receipt by a given detector is a function of the distance of a target from that detector. In such a way, time based triangulation is employed to determine the location of the target in the protected volume.

Figure 11:
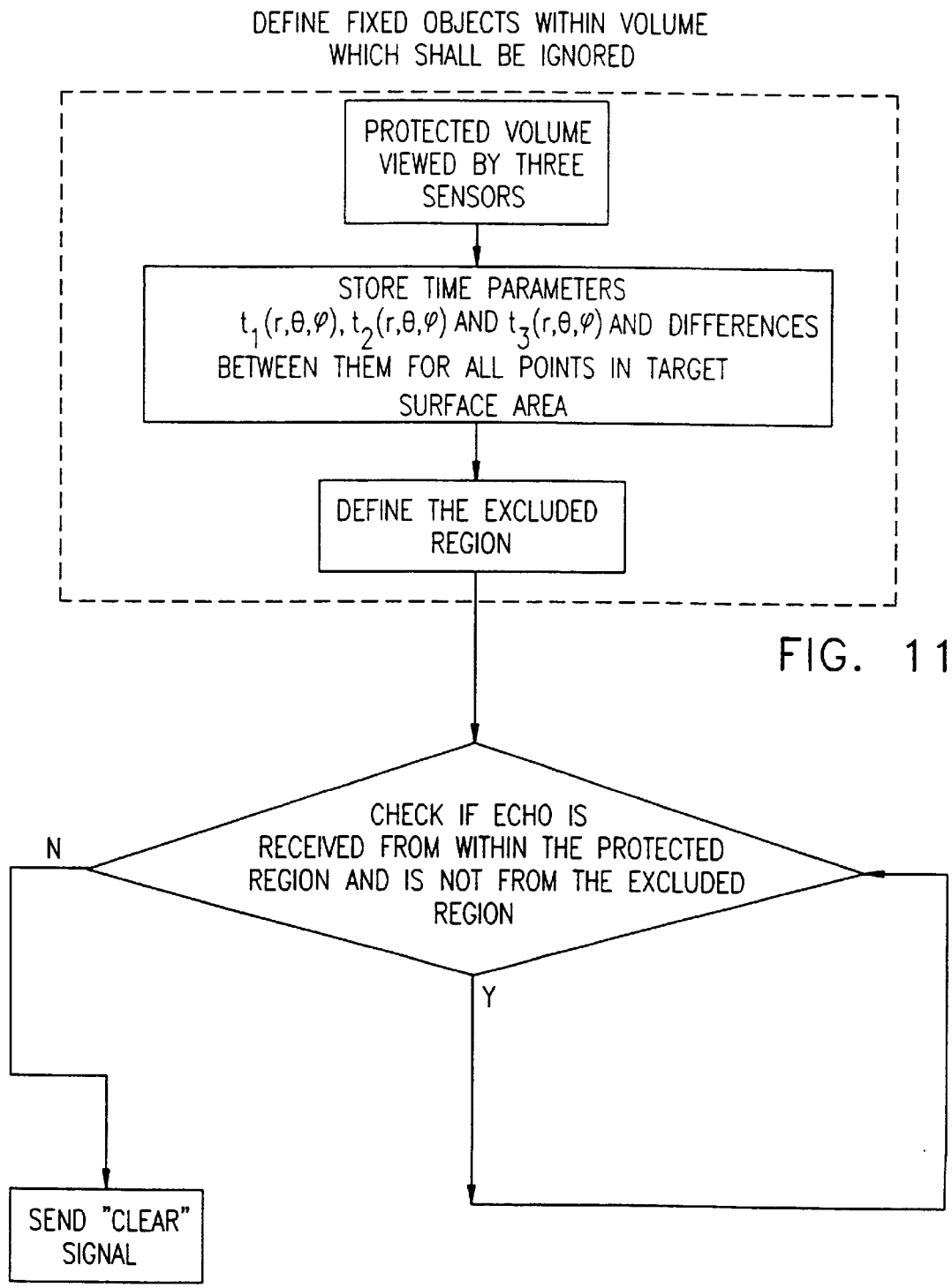
FIG. 11 is a detailed flow chart illustrating part of the operating algorithm of the safety apparatus of the present invention.

FIG. 11 illustrates the operating algorithm of the apparatus of FIG. 9 in eliminating consideration of echoes received from defined volumes enclosing fixed objects within the protected volume. The protected volume is initially viewed by three sensors and the fixed objects therein are mapped. An excluded volume is then defined which encloses each of the mapped fixed objects.

During steady state operation of the apparatus, echoes from both outside the protected volume and from the excluded volumes (where an excluded volume is defined as a legitimate region including background objects) which enclose the fixed objects within the protected volume are not considered. If and only if echoes are received from within the protected volume but outside the excluded volumes is door closure prevented or a corresponding action taken or avoided in another operational context.

Figure 12:
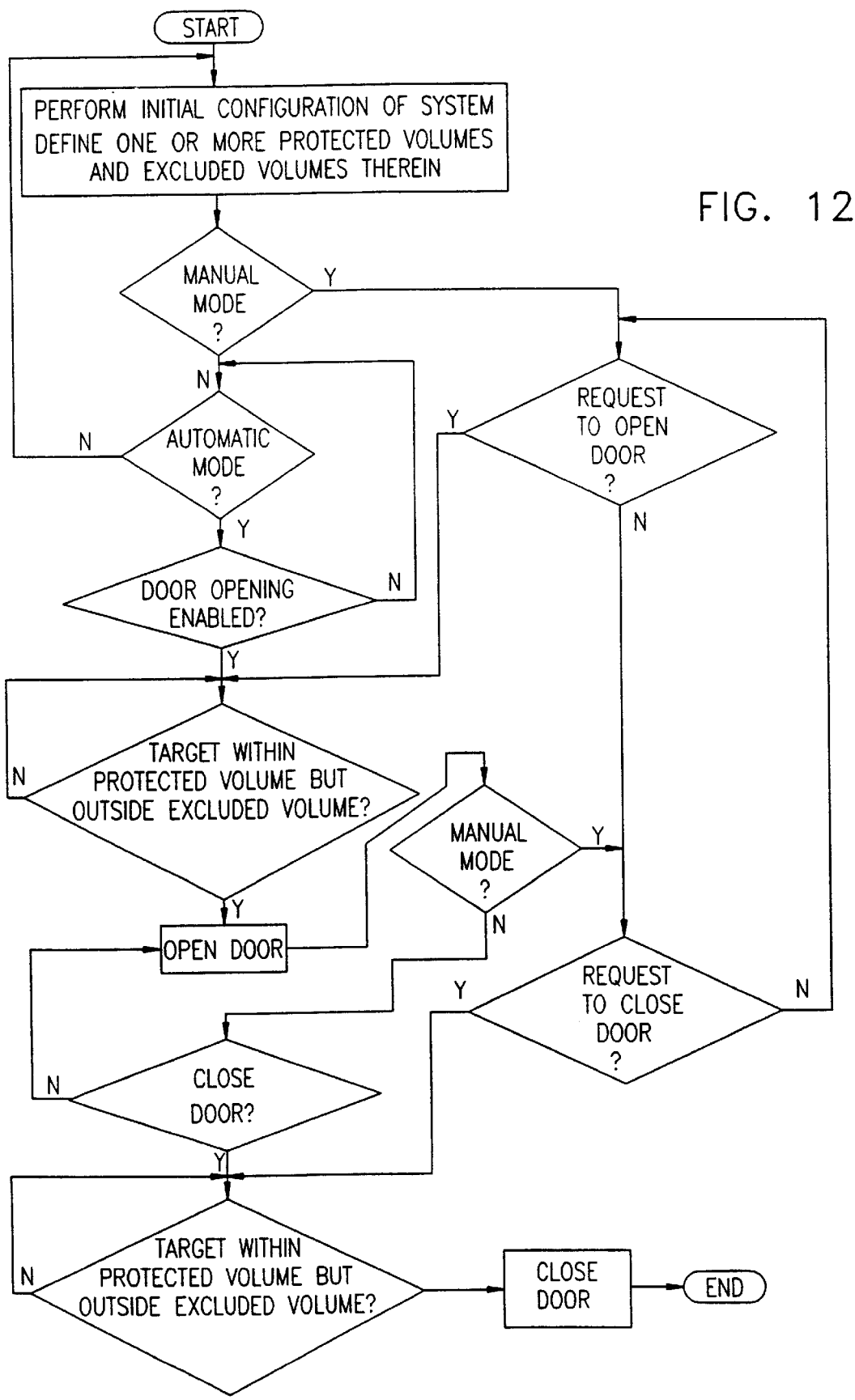
FIG. 12 is a general flow chart illustrating operation of a preferred embodiment of the present invention.

It is a particular feature of the present invention that the apparatus of the present invention can be used not only for preventing closing of doors but also for automatic door opening without additional hardware. Reference is now made to FIG. 12 which illustrates the operation of the present invention.

As seen in FIG. 12, following initial configuration of the system and definition of one or more protected volumes and excluded volumes therewithin, a vehicle is operated selectably in a manual mode, wherein door opening and closing is controlled exclusively by an operator or in an automatic mode wherein at least one and preferably both door opening and closing is automatically controlled.

Door opening may be enabled by an operator when he reaches a station or automatically by a sensor which senses arrival at a station and stopping of the vehicle. In the automatic mode of operation, even after door opening is enabled by the operator, the door will only be opened when a target is located within a predetermined protected volume but outside an excluded volume therewithin. In this case the target is normally part of a passenger's body.

The same sensors and logic apparatus may be employed for automatic door closing. When door closing is enabled by an operator or by any other suitable automatic or semiautomatic system, the door will only be closed when a target is not located within a protected volume but outside an excluded volume therewithin.

It is a particular feature of the present invention that the protected volume for door opening need not be identical with the protected volume for door closing, notwithstanding that the same hardware is employed. Selection of the protected volumes may be made by suitable calibrations or instructions given to the detector circuitry or other circuitry in the system.

It will be appreciated by persons skilled in the art that the present invention is not limited by what has been particularly shown and described hereinabove. Rather the scope of the present invention is defined only by the claims which follow:

What is claimed is:

1. Door control apparatus for vehicles comprising:
   at least one sensor viewing at least one region in the vicinity of a door;
   logic circuitry responsive to said at least one sensor for providing at least one region clear output signal;
   automatic door opening and door closing apparatus responsive at least to the absence of a region clear output signal to cause opening of said door and responsive at least to the presence of a region clear output signal to cause closing of said door; and wherein said automatic door opening and door closing apparatus is responsive at least to the absence of a first region clear output signal in respect of a first region to cause opening of said door and responsive at least to the presence of a second region clear output signal, different from the first region clear output signal, in respect of a second region different from said first region, to cause closing of said door.

2. Door control apparatus according to claim 1 and wherein said first and second regions are mutually overlapping.

3. Door control apparatus according to claim 1 and wherein said first and second regions are mutually exclusive.

4. Door control apparatus according to claim 1 and wherein said first and second regions are partially mutually overlapping.

5. Safety apparatus for preventing injurious engagement of machinery with a user and clothing and accouterments thereof within a predetermined volume comprising:
   a sensor having two modes of operation:
      a reference sensing mode of operation for sensing the boundaries of the predetermined volume; and
      an engagement prevention mode of operation for sensing the presence of a user and clothing and accouterments thereof within the predetermined volume; and control apparatus responsive to outputs from said sensor in both of said modes of operation for preventing operation of said machinery when the presence of a user and clothing and accouterments thereof within the predetermined volume could cause injurious engagement.

6. Safety apparatus according to claim 5 and wherein said sensor comprises at least one ultrasonic transducer.

7. Safety apparatus according to either of claims 5 and 6 and wherein said sensor is operative in said reference sensing mode of operation in the absence of a user or operator within the predetermined volume.

8. Safety apparatus according to claim 5 and wherein said sensor is operative in said reference sensing mode of operation with generally the same frequency as it is operative in said engagement prevention mode of operation.

9. Safety apparatus according to claim 5 and wherein said sensor is operative in said reference sensing mode of operation with a frequency much less than it is operative in said engagement prevention mode of operation.

10. Safety apparatus according to claim 5 and wherein said sensor comprises at least two sensors viewing the predetermined volume and together providing an output indication of the location of objects within the predetermined volume in at least two dimensions and wherein said control apparatus is responsive to said output indication for preventing operation of said machinery when the presence of a user and clothing and accouterments thereof at predetermined locations within the predetermined volume could cause injurious engagement.

11. Safety apparatus according to claim 5 and wherein said control apparatus is operative to be non responsive to predetermined regions within an outer boundary of said predetermined volume, corresponding to predetermined time domains.

12. Safety apparatus for preventing injurious engagement of machinery with a user and clothing and accouterments thereof within a predetermined volume comprising:
  at least two sensors viewing the predetermined volume and together providing an output indication of the location of objects within the predetermined volume in at least two dimensions;
  control apparatus responsive to said output indication for preventing operation of said machinery when the presence of a user and clothing and accouterments thereof at predetermined locations within the predetermined volume could cause injurious engagement.

13. Safety apparatus according to claim 12 and wherein said at least two sensors comprise at least two ultrasonic transducers.

14. Safety apparatus according to claim 12 or claim 13 and wherein said control apparatus excludes predetermined three-dimensional regions from said predetermined volume corresponding to predetermined combinations of different time domains of said at least two sensors.

15. An automatic door operating system for a vehicle comprising an automatically operable door, a sensor for sensing the presence of an object within a predetermined volume located at the door of the vehicle and above steps leading to the door of the vehicle from the outside thereof, and a door controller operative at least partially in response to an output from the sensor to actuate the automatically operable door.

16. Apparatus according to claim 15 and wherein the sensor is an ultrasonic sensor.

17. Apparatus according to claim 15 or claim 16 and wherein said sensor is insensitive to inputs received from outside the predetermined volume.

18. A vehicle having a chassis, a body and propulsion apparatus, the body including at least one automatic door operating system comprising an automatically operable door, a sensor for sensing the presence of an object within a predetermined volume located at the door of the vehicle and above steps leading to the door of the vehicle from the outside thereof, and a door controller operative at least partially in response to an output from the sensor to actuate the automatically operable door.

19. Apparatus according to claim 18 and wherein the sensor is an ultrasonic sensor.

20. Apparatus according to claim 18 or claim 19 and wherein said sensor is insensitive to inputs received from outside the predetermined volume.

21. An automatic door operating system comprising an automatically operable door, a single sensor for sensing the presence of an object within a plurality of disconnected volumes located at the door, and a door controller operative at least partially in response to an output from the sensor to actuate the automatically operable door.

22. An elevator having a cab arranged for motion along a travel path and comprising an automatic door operating system including an automatically operable door, a sensor for sensing an automatically operable door, a single sensor for sensing the presence of an object within a plurality of disconnected volumes located at the door, and a door controller operative at least partially in response to an output from the sensor to actuate the automatically operable door.

23. A vehicle having a chassis, a body and propulsion apparatus, the body including an automatic door operating system including an automatically operable door, a sensor for sensing an automatically operable door, a single sensor for sensing the presence of an object within a plurality of disconnected volumes located at the door, and a door controller operative at least partially in response to an output from the sensor to actuate the automatically operable door.

24. A vehicle including a chassis, a drive train, at least one door and door control apparatus comprising:
  at least one sensor viewing at least one region in the vicinity of a door;
  logic circuitry responsive to said at least one sensor for providing at least one region clear output signal;
  automatic door opening and door closing apparatus responsive at least to the absence of a region clear output signal to cause opening of said door and responsive at least to the presence of a region clear output signal to cause closing of said door.

25. A vehicle according to claim 24 and wherein said automatic door opening and door closing apparatus is responsive at least to the absence of a region clear output signal to cause opening of said door and responsive at least to the presence of the same region clear output signal to cause closing of said door.

26. A vehicle according to claim 24 and wherein said automatic door opening and door closing apparatus is responsive at least to the absence of a first region clear output signal in respect of a first region to cause opening of said door and responsive at least to the presence of a second region clear output signal, different from the first region clear output signal, in respect of a second region different from said first region, to cause closing of said door.

27. A vehicle according to claim 26 and wherein said first and second regions are mutually overlapping.

28. A vehicle according to claim 26 and wherein said first and second regions are mutually exclusive.

29. A vehicle according to claim 26 and wherein said first and second regions are partially mutually overlapping.

* * * * *